(12) United States Patent
Hassan (10) Patent No.: US 12,292,157 B1
(45) Date of Patent: May 6, 2025

(54) METHOD FOR REFURBISHING PRE-STRESSED CONCRETE CYLINDER PIPE AND REFURBISHED PRE-STRESSED CONCRETE CYLINDER PIPE

(71) Applicant: TECHNICAL CONSTRUCTION INFRASTRUCTURE INC., Mississauga (CA)

(72) Inventor: Khaled Hassan, Mississauga (CA)

(73) Assignee: TECHNICAL CONSTRUCTION INFRASTRUCTURE INC., Mississauga (CA)

( * ) Notice: Subject to any disclaimer, the term of this patent is extended or adjusted under 35 U.S.C. 154(b) by 0 days.

(21) Appl. No.: 18/924,432

(22) Filed: Oct. 23, 2024

(30) Foreign Application Priority Data

Jun. 28, 2024 (CA) ..................................... 3244725

(51) Int. Cl.
*F16L 9/08* (2006.01)
*B29C 63/34* (2006.01)
(Continued)

(52) U.S. Cl.
CPC ............ *F16L 9/085* (2013.01); *B29C 63/346* (2013.01); *F16L 25/0027* (2013.01);
(Continued)

(58) Field of Classification Search
CPC .......... B29C 63/346; F16L 9/08; F16L 9/085; F16L 9/153; F16L 13/029; F16L 13/113;
(Continued)

(56) References Cited

U.S. PATENT DOCUMENTS

| 1,013,660 A | * | 1/1912 | Kaufman | ............... F16L 13/113 138/175 |
| 1,346,687 A | * | 7/1920 | Scofield | ................ F16L 51/005 138/175 |

(Continued)

FOREIGN PATENT DOCUMENTS

| CA | 2029144 A1 | * | 5/1991 | ................ F16L 9/08 |
| CA | 2913839 A1 | | 6/2017 | |

(Continued)

OTHER PUBLICATIONS

Engindeniz, M., & Zarghamee, M.S. Evolution of the CFRP Repair of Pipelines—The Road to a Well-Established Technology. Pipelines 2016, pp. 1568-1577. https://doi.org/10.1061/9780784479957.146 (Year: 2016).*

(Continued)

*Primary Examiner* — Robert K Arundale
*Assistant Examiner* — Richard K. Durden
(74) *Attorney, Agent, or Firm* — Tarolli, Sundheim, Covell & Tummino LLP (57) ABSTRACT

A method for refurbishing a pre-stressed concrete cylinder pipe (PCCP) comprises removing concrete from an existing inner surface of the PCCP at each end thereof to expose a metal core, cleaning the exposed metal core and depositing filler over the exposed metal core at each end of the PCCP to a thickness wherein the filler is substantially flush with the existing inner surface. One or more layers of carbon fibre reinforced polymer (CFRP) liner are applied to the existing inner surface of the PCCP and to the filler at each end of the PCCP. Each layer of CFRP liner conforms to the inner surface of the PCCP and the filler and remains substantially cylindrical with substantially constant diameter along a length of the PCCP with substantially unbent cylindrical (Continued)

ends. After curing all layer(s) of CFRP liner, each terminus of the layer(s) of CFRP liner is sealed.

20 Claims, 7 Drawing Sheets

(51) Int. Cl.
    *F16L 13/11*     (2006.01)
    *F16L 25/00*     (2006.01)
    *F16L 55/163*     (2006.01)
    *F16L 58/18*     (2006.01)
    *B28B 19/00*     (2006.01)
    *E03F 3/06*     (2006.01)
    *F16L 9/153*     (2006.01)
    *F16L 49/02*     (2006.01)

(52) U.S. Cl.
    CPC ......... *F16L 55/163* (2013.01); *B28B 19/0023* (2013.01); *E03F 2003/065* (2013.01); *F16L 9/153* (2013.01); *F16L 13/113* (2013.01); *F16L 49/02* (2013.01); *F16L 58/185* (2013.01)

(58) Field of Classification Search
    CPC ....... F16L 25/002; F16L 49/02; F16L 51/005; F16L 55/163; F16L 58/185
    USPC ................................... 138/175, 176, DIG. 5
    See application file for complete search history.

(56) References Cited

U.S. PATENT DOCUMENTS

| | | | | |
|---|---|---|---|---|
| 2,024,488 A * | 12/1935 | Ukropina | ............ | F16L 25/0027 285/344 |
| 2,084,466 A * | 6/1937 | Ukropina | ............... | F16L 13/113 285/290.1 |
| 2,138,946 A * | 12/1938 | Trickey | ............... | F16L 25/0027 29/451 |
| 2,348,477 A * | 5/1944 | Jenkins | ................... | B28B 21/58 138/145 |
| 2,470,009 A * | 5/1949 | Loomis | ..................... | F16L 9/08 138/145 |
| 3,228,425 A * | 1/1966 | Pacella | ................. | F16L 13/113 285/293.1 |
| 3,516,446 A * | 6/1970 | O'Hargan | ............ | F16L 55/163 285/239 |
| 4,346,922 A * | 8/1982 | Ohtsuga | ................ | F16L 55/163 285/915 |
| 4,685,704 A * | 8/1987 | Kolar | .................... | F16L 55/163 285/236 |
| 4,808,032 A * | 2/1989 | John | ....................... | E21B 17/00 405/184 |
| 4,972,880 A * | 11/1990 | Strand | ................. | F16L 55/1656 174/DIG. 8 |
| 6,126,206 A * | 10/2000 | Topf, Jr. | ................ | F16L 55/163 285/109 |
| 7,267,507 B2 * | 9/2007 | Lecinq | .................... | F16L 9/153 138/97 |
| 7,334,820 B2 * | 2/2008 | Fasel | ................... | F16L 58/1009 285/55 |
| 8,480,093 B2 * | 7/2013 | Skinner | ................. | F16L 55/163 277/616 |
| 9,052,051 B2 * | 6/2015 | Maimets | ............... | F16L 55/163 |
| 2009/0278321 A1 * | 11/2009 | Skinner | ................. | F16L 55/163 29/428 |
| 2011/0074116 A1 * | 3/2011 | Neuhaus | ............... | F16L 55/163 29/428 |

FOREIGN PATENT DOCUMENTS

| | | | | |
|---|---|---|---|---|
| CN | 103542227 A | | 1/2014 | |
| CN | 104534221 A | | 4/2015 | |
| CN | 109373061 A | | 2/2019 | |
| CN | 210661715 U | | 6/2020 | |
| GB | 1569979 A | * | 6/1980 | .............. F16L 21/02 |
| GB | 2373830 A | * | 10/2002 | ............ F16L 55/163 |
| KR | 10-1650719 B1 | | 8/2016 | |
| KR | 10-2217237 B1 | | 2/2021 | |
| WO | 2005088182 A1 | | 9/2005 | |

OTHER PUBLICATIONS

Arnold, S. F., Gipsov, M., & Ojdrovic, R. Shooting at a Moving Target: Forensic Analysis of CFRP Strengthened PCCP Confirms the Evolution of Joint Detailing and Design. Pipelines 2017, pp. 363-372. https://doi.org/10.1061/9780784480892.035 (Year: 2017).*
Zarghamee, M.S. AWWA C305—A New Standard for CFRP Renewal and Strengthening of PCCP. Pipelines 2019, pp. 535-544. https://doi.org/10.1061/9780784482490.057 (Year: 2019).*
Concrete Pressure Pipe Repair Guide. [online]. American Concrete Pressure Pipe Association, 2020 [retrieved on Dec. 18, 2024]. Retreived from the Internet <https://acppa.org/wp-content/uploads/2023/09/1-ACPPA-Repair-Guilde.pdf>. (Year: 2020).*

* cited by examiner

METHOD FOR REFURBISHING PRE-STRESSED CONCRETE CYLINDER PIPE AND REFURBISHED PRE-STRESSED CONCRETE CYLINDER PIPE

CROSS-REFERENCE TO RELATED APPLICATION

This patent application claims priority to a Canadian filed U.S. Pat. No. 3,244,725, filed Jun. 28, 2024, and entitled: METHOD FOR REFURBISHING PRE-STRESSED CONCRETE CYLINDER PIPE AND REFURBISHED PRE-STRESSED CONCRETE CYLINDER PIPE. The entire contents of the above-identified patent application is incorporated herein by reference.

TECHNICAL FIELD

The present disclosure relates to pipelines, and more particularly to refurbishing pipelines.

BACKGROUND

Pre-stressed concrete cylinder pipe (PCCP) is widely used in municipal water applications (water supply and wastewater). PCCP includes lined-cylinder pipe (LCP) and embedded-cylinder pipe (ECP). Both types include an inner concrete core, a metal cylinder (typically steel) surrounding the inner concrete core, steel pre-stressing wire, and an outer mortar coating. In LCP, the pre-stressing wire is wrapped directly on the metal core and then the mortar coating surrounds and protects the pre-stressing wire and the metal core. In ECP, there is an outer concrete core surrounding the metal core, and the pre-stressing wire is wrapped on the outer concrete core, with the mortar coating surrounding the pre-stressing wire and the outer concrete core.

Each segment of PCCP has a wider bell end and a narrower spigot end, with the bell end and the spigot end having complementary shapes so that the spigot end of each PCCP segment can fit into and form a joint with the bell end of an adjacent PCCP segment. The spigot end is fitted with a metal (typically steel) spigot ring welded to the metal cylinder and extending outwardly beyond the inner concrete core, and the bell end is likewise fitted with a metal (typically steel) bell ring welded to the metal cylinder and extending outwardly beyond the inner concrete core. The spigot ring, metal cylinder and bell ring together form a metal core of the PCCP segment. The spigot ring will typically include an outwardly facing annular channel adapted to receive an O-ring gasket to form a watertight seal with the bell ring of the adjacent PCCP segment. The annular gap between the bell end of one PCCP segment and the spigot end of the adjacent PCCP segment is filled with grout or cement to protect the bell ring and the spigot ring against corrosion. The term "joint ring" encompasses both spigot rings and bell rings.

PCCP may fail in a variety of ways. One failure mode is breakage of the pre-stressing wire, which can compromise the structural integrity of the PCCP segment. Such failure can be detected using electromagnetic detection. Replacing the weakened segment of PCCP is one option, although this requires excavation. Another option is to install a carbon fibre reinforced polymer (CFRP) lining on the inner surface of the inner concrete core. The American Water Works Association (AWWA) has released a standard governing the renewal and strengthening of PCCP using CFRP: AWWA C305-18.

According to the AWWA C305-18 standard, the inner concrete core is chipped away at each end of the PCCP segment to be repaired, to expose the metal core (part of the metal cylinder and/or the joint rings), which is then cleaned. Epoxy mortar is deposited on the exposed ends of the metal core and joint rings to form an outwardly tapered annular ramp on the inner surface at each end of the PCCP segment. The CFRP lining is then applied to the inner surface of the inner concrete core, and to the annular ramps, with glass fibre being used to isolate the CFRP lining from the metal cylinder and joint rings. A metal ring (typically stainless steel) is then installed at each end of the PCCP segment to be repaired and expanded against the CFRP liner and the steel core and/or joint rings. The annular gaps in the inner surface between the PCCP segment that was repaired and the adjacent PCCP segments are then filled with additional epoxy mortar.

Because the CFRP lining is provided as one or more sheets of epoxy-impregnated carbon fibre, in order to conform the ends of the sheet to the annular ramps on the inner surface of the PCCP segment, the ends of the sheets must be cut longitudinally into strips and then bent outwardly to accommodate the increase in diameter. This requires patching to cover the gaps between the strips, and can compromise the integrity of the CFRP reinforcement.

SUMMARY

In one aspect, the present disclosure is directed to a method for refurbishing a first pre-stressed concrete cylinder pipe (PCCP). The method comprises removing concrete from an inner concrete core of the first PCCP at each end thereof to expose a metal core of the first PCCP at each end of the first PCCP. The method further comprises, after removing the concrete, cleaning the exposed metal core at each end of the first PCCP and, after cleaning the exposed metal core, depositing filler over the exposed metal core at each end of the first PCCP. The filler is deposited to a thickness wherein the filler at each end of the first PCCP is substantially flush with an inner surface of the inner concrete core. The method further comprises, after depositing the filler, applying a first layer of carbon fibre reinforced polymer (CFRP) liner to the inner surface of the inner concrete core and to inner surfaces of the filler at each end of the first PCCP. The first layer of CFRP liner conforms to the inner surface of the inner concrete core and to the inner surfaces of the filler, and the first layer of CFRP liner remains substantially cylindrical with substantially constant diameter along a length of the first PCCP and the first layer of CFRP liner has substantially unbent cylindrical ends. The method further comprises, after applying the first layer of CFRP liner, curing the first layer of CFRP liner inside the first PCCP to secure adhesion of the first layer of CFRP liner to the inner surface of the inner concrete core and the inner surfaces of the filler, and, after curing the first layer of CFRP liner, sealing each terminus of the first layer of CFRP liner.

In some embodiments, sealing each terminus of the first layer of CFRP liner comprises placing double-band seals inside the first PCCP at each end thereof. Each double-band seal spans an interior joint between the first PCCP and an adjacent PCCP. A first retaining band of each double-band seal is disposed inside the first PCCP and a second retaining band of each double-band seal is disposed inside a respective one of the adjacent PCCPs. Each terminus of the first layer of CFRP liner is disposed between the first retaining band and the second retaining band of a respective one of the double-band seals.

In some embodiments, the method further comprises, after curing the first layer of CFRP liner, and before sealing each terminus of the first layer of CFRP liner, applying a second layer of CFRP liner to the first layer of CFRP liner and curing the second layer of CFRP liner inside the first PCCP to secure adhesion of the second layer of CFRP liner to the first layer of CFRP liner, and after curing the second layer of CFRP liner, sealing each terminus of the second layer of CFRP liner. In some particular embodiments, the method still further comprises, after curing the second layer of CFRP liner, and before sealing each terminus of the first layer of CFRP liner and each terminus of the second layer of CFRP liner, applying a third layer of CFRP liner to the second layer of CFRP liner and curing the third layer of CFRP liner inside the first PCCP to secure adhesion of the third layer of CFRP liner to the second layer of CFRP liner, and, after curing the third layer of CFRP liner, sealing each terminus of the first layer of the CFRP liner, the second layer of CFRP liner and the third layer of CFRP liner.

In some embodiments, the method further comprises, after cleaning the exposed metal core and before depositing the filler, depositing a primer layer on the exposed metal core at each end of the first PCCP.

In some embodiments, the method further comprises, after cleaning the exposed metal core and before depositing the filler, depositing a transition layer of glass fiber reinforced polymer (GFRP) over the exposed metal core at each end of the first PCCP. After depositing the filler, the transition layer of GFRP is disposed between the metal core and the inner surfaces of the filler. In particular embodiments, the transition layer of GFRP may comprise a glass fibre fabric saturated with an epoxy adhesive, where a first face of the glass fibre fabric is formed from unidirectional woven fibres, a second face of the glass fibre fabric is formed from chopped glass fibres, and the second face of the glass fibre fabric faces the metal core.

In some embodiments, the filler may be an epoxy filler reinforced with chopped glass fibre.

In some embodiments, removing the concrete from the inner concrete core at each end thereof exposes portions of metal joint rings of the metal core, cleaning the exposed metal core at each end of the first PCCP comprises cleaning the exposed portions of the metal joint rings at each end of the first PCCP, and depositing the filler over the exposed metal core at each end of the first PCCP comprises depositing the filler over the cleaned exposed portions of the metal joint rings at each end of the first PCCP to be substantially flush with the inner surface of the inner concrete core.

In the methods described above, the PCCP may be a lined-cylinder pipe (LCP) or may be an embedded-cylinder pipe (ECP).

In another aspect, the present disclosure is directed to a refurbished first pre-stressed concrete cylinder pipe (PCCP). The refurbished PCCP comprises an inner concrete core, a metal core comprising a metal cylinder surrounding the inner concrete core and a respective metal joint ring at each end of the metal cylinder, pre-stressing wire surrounding the metal cylinder, and a mortar coating surrounding the pre-stressing wire. An annular recess is formed in the inner concrete core at each end of the PCCP with the metal cylinder extending into each annular recess free of the inner concrete core, and filler is disposed over the metal core in each annular recess. The filler is substantially flush with an inner surface of the inner concrete core. At least one layer of cured carbon fibre reinforced polymer (CFRP) liner is adhered over the inner surface of the inner concrete core and over inner surfaces of the filler in the annular recesses. Each layer of CFRP liner conforms to the inner surface of the inner concrete core and the inner surfaces of the filler. Each layer of CFRP liner is substantially cylindrical with substantially constant diameter along a length of the first PCCP, and each layer of CFRP liner has substantially unbent cylindrical ends. Each terminus of each layer of CFRP liner is sealed.

In some embodiments, the first PCCP further comprises a primer layer on the metal core at each end of the first PCCP.

In some embodiments, the first PCCP further comprises a transition layer of glass fiber reinforced polymer (GFRP) over the metal core at each end of the first PCCP. The transition layer of GFRP is disposed between the metal core and the filler. In particular embodiments, the transition layer of GFRP comprises a glass fibre fabric saturated with an epoxy adhesive, with a first face of the glass fibre fabric formed from unidirectional woven fibres and the second face of the glass fibre fabric formed from chopped glass fibres, the second face of the glass fibre fabric faces the metal core.

In some embodiments, the filler is an epoxy filler reinforced with chopped glass fibre.

In some embodiments, each annular recess overlies a portion of the respective one of the metal joint rings of the metal core, and the filler is disposed over the portions of the metal joint rings within the annular recesses.

The first PCCP may be a lined-cylinder pipe (LCP) wherein the pre-stressing wire is wrapped directly on the metal core and the mortar coating surrounds the pre-stressing wire and the metal core, or the first PCCP may be is an embedded-cylinder pipe (ECP) wherein an outer concrete core surrounds the metal core and the pre-stressing wire is wrapped on the outer concrete core, with the mortar coating surrounding the pre-stressing wire and the outer concrete core.

In some embodiments, a pipeline comprises the first PCCP and second PCCPs joined to the first PCCP at each end thereof, with double-band seals disposed inside the first PCCP at each end thereof. Each double-band seal spans an interior joint between the first PCCP and an adjacent one of the second PCCPs. A first retaining band of each double-band seal is disposed inside the first PCCP and a second retaining band of each double-band seal is disposed inside a respective one of the second PCCPs. Each terminus of each layer of CFRP liner is disposed between the first retaining band and the second retaining band of a respective one of the double-band seals.

BRIEF DESCRIPTION OF THE DRAWINGS

These and other features will become more apparent from the following description in which reference is made to the appended drawings wherein.

DETAILED DESCRIPTION

Figure 1:
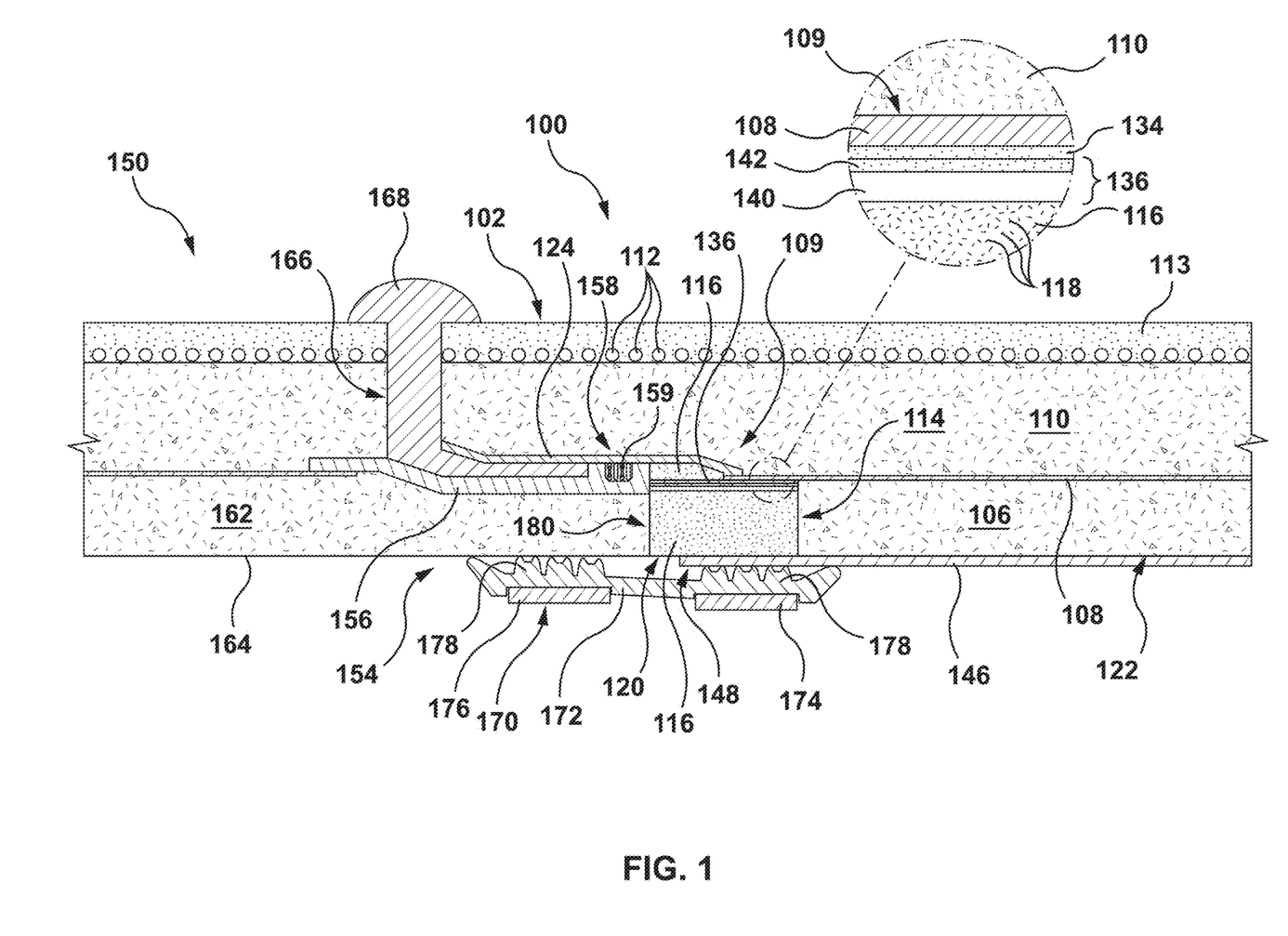
FIG. 1 shows a cross-sectional termination detail of a bell end of a refurbished embedded-cylinder pipe according to an aspect of the present disclosure.
Figure 2:
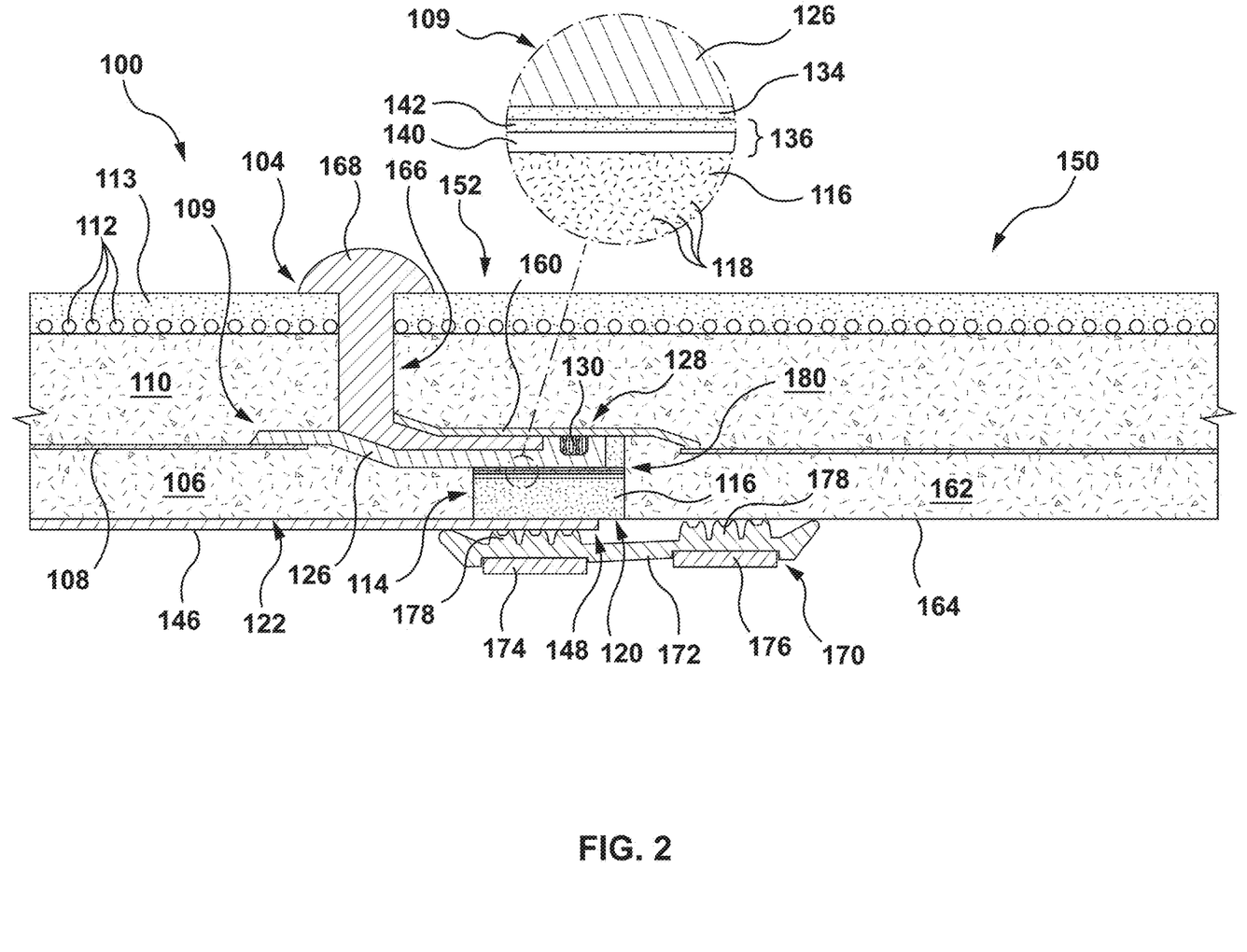
FIG. 2 shows a cross-sectional termination detail of a spigot end of a refurbished embedded-cylinder pipe according to an aspect of the present disclosure.

FIGS. 1 and 2 show cross-sections of the ends of a refurbished pre-stressed concrete cylinder pipe (PCCP) 100. FIG. 1 shows the bell end 102 of the PCCP 100, and FIG. 2 shows the spigot end 104 of the PCCP 100. The PCCP 100 shown in FIGS. 1 and 2 is an embedded-cylinder pipe (ECP). The PCCP 100 comprises an inner concrete core 106 and a metal cylinder 108 surrounding the inner concrete core 106. The metal cylinder 108 is welded to a metal joint ring at either end. In FIG. 1, the joint ring is a bell ring 124 and in FIG. 2, the joint ring is a spigot ring 126. The metal cylinder 108, bell ring 124 and spigot ring 126 together form a metal core 109 of the PCCP. The spigot ring 126 has an outwardly facing annular recess 128 that accommodates an O-ring seal 130. An outer concrete core 110 surrounds the metal cylinder 108 and the bell ring 124, pre-stressing wire 112 is wrapped on the outer concrete core 110 and a mortar coating 113 surrounds the pre-stressing wire 112 and the outer concrete core 110. Since the outer concrete core 110 surrounds the metal cylinder 108 and the pre-stressing wire 112 is wrapped on the outer concrete core 110, the pre-stressing wire 112 surrounds the metal cylinder 108.

An annular recess 114 is formed in the inner concrete core 106 at each end 102, 104 of the PCCP 100. The metal core 109 extends into each annular recess 114 free of the inner concrete core 106; the inner concrete core 106 terminates at each annular recess 114. In FIG. 1, the metal cylinder 108 and the bell ring 124 extend into the annular recess 114 at the bell end 102, and in FIG. 2 the spigot ring 126 extends into the annular recess 114 at the spigot end 104. As will be described further below, the annular recesses 114 may be formed by chipping away the ends of the inner concrete core 106 at each end 102, 104 of the PCCP 100 to expose the metal core 109. Preferably, at least 3 inches (about 7.62 cm) of the inner concrete core 106, measured longitudinally along the PCCP 100, is chipped away at each end 102, 104 of the PCCP 100.

The annular recesses 114 are filled with filler 116 such that the filler 116 is disposed over the metal core 109 in each annular recess 114. In a preferred embodiment, the filler 116 comprises thickened thermoset epoxy-based adhesive material. In a particularly preferred embodiment, the filler 116 is reinforced; in the illustrated embodiment the filler 116 is an epoxy filler reinforced by chopped glass fibre (CGF) 118. In a preferred embodiment, the glass fibres used for reinforcement have a maximum length of about ¼ inch (about 0.635 cm). It is also preferred that the mixing ratio of the CGF 118 and the filler 116 is 1%, e.g. 1 g of CGF 118 per 100 g of filler 116. Without being limited by theory, and without promising any particular utility, it is believed that when the filler 116 is a thickened epoxy filler, the CGF 118 inhibits thermal cracking of the filler 116 where the filler 116 has relatively large thicknesses, e.g. greater than one inch (2.54 cm). The thickness of the filler 116 is such that the inner surfaces 120 of the filler 116 are substantially flush with the inner surface 122 of the inner concrete core 106.

In the illustrated embodiment, each annular recess 114 overlies a portion of a respective metal joint ring of the PCCP. In FIG. 1, the annular recess 114 overlies the bell end of the metal cylinder 108 and the cylinder end of the bell ring 124 (the end welded to the metal cylinder 108) and the filler 116 is disposed in the annular recess 114 to cover the bell end of the metal cylinder 108 and the cylinder end of the bell ring 124. In FIG. 2, the annular recess 114 overlies the distal end (distal from the metal cylinder 108) of the spigot ring 126 and the filler 116 is disposed in the annular recess 114 to cover the distal end of the spigot ring 126. The inner surfaces 120 of the filler 116, including the filler 116 disposed over the bell end of the metal cylinder 108 and the cylinder end of the bell ring 124, and the filler 116 disposed over the cylinder end of the spigot ring 126, is substantially flush with the inner surface 122 of the inner concrete core 106.

Preferably, a primer layer 134 is disposed on the metal core 109 at each end of the PCCP; preferably the primer layer comprises an epoxy primer and more preferably a two-part thermoset epoxy primer. In a preferred embodiment, the primer has a thickness of about 5 to 7 mils (about 0.127 to 0.178 mm). In a preferred embodiment, a transition layer of glass fiber reinforced polymer (GFRP) 136 is disposed over the metal core 109 at each end 102, 104 of the PCCP 100, between the metal core 109 and the filler 116.

In a particularly preferred embodiment, each transition layer of GFRP 136 comprises a glass fibre fabric 138 saturated with an epoxy adhesive, preferably a two-part epoxy adhesive. Preferably, a first face 140 of the glass fibre fabric is formed from unidirectional woven fibres and a second face 142 of the glass fibre fabric is formed from chopped glass fibres. The glass fibre fabric preferably has a weight of at least 500 g/m². The transition layer of GFRP 136 is arranged so that the second face 142 of the glass fibre fabric faces the metal core 109. In the illustrated embodiment, the transition layer of GFRP 136 at the bell end 102 extends past the metal cylinder 108 and overlies the cylinder end of the bell ring 124 and the transition layer of GFRP 136 overlies the distal end of the spigot ring 126. Additional filler 116 is disposed between the respective transition layers of GFRP 136 and the cylinder end of the bell ring 124.

One or more layers (plies) of cured carbon fibre reinforced polymer (CFRP) liner 146 are adhered over the inner surface 122 of the inner concrete core 106 and over the inner surfaces 120 of the filler 116 in the annular recesses 114. The number of layers in the CFRP liner 146 will depend on the design specification. In a preferred embodiment, the CFRP liner 146 is made from different types of unidirectional and bidirectional carbon fibre fabric, saturated with an epoxy-based thermoset adhesive.

Each layer of the CFRP liner 146 conforms to the inner surface 122 of the inner concrete core 106 and further conforms to the inner surface 120 of the filler 116. Because the inner surface 120 of the filler 116 is substantially flush with the inner surface 122 of the inner concrete core 106, each layer of the CFRP liner 146 is substantially cylindrical with substantially constant diameter along the length of the PCCP 100 and each layer of the CFRP liner 146 has substantially unbent cylindrical ends. Without promising any particular utility, because the CFRP liner 146 has substantially unbent cylindrical ends, cutting and patching of the CFRP liner 146 is avoided. Each terminus 148 of each layer of the CFRP liner 146 is sealed.

In FIGS. 1 and 2, the PCCP 100 is part of a pipeline that includes adjacent PCCPs 150 joined to the PCCP 100 at each end 102, 104 thereof. The adjacent PCCPs 150 each have a respective bell end 152 and spigot end 154.

As shown in FIG. 1, the bell end 102 of the PCCP 100 receives the spigot end 154 of the adjacent PCCP 150. The spigot end 154 of the adjacent PCCP 150 includes a spigot ring 156, which forms an outwardly facing annular channel 158 having an O-ring gasket 159 that forms a watertight seal with the bell ring 124 of the PCCP 100. The filler 116 extends to and engages the end of the spigot ring 156 the adjacent PCCP 150.

As can be seen in FIG. 2, the spigot end 104 of the PCCP 100 is received within the bell end 152 of the adjacent PCCP 150. The O-ring seal 130 in the annular recess 128 of the spigot ring 126 of the PCCP 100 forms a watertight seal with the bell ring 160 at the bell end 152 of the adjacent PCCP 150. Part of the inner concrete core 162 of the adjacent PCCP 150 may also be removed, and the filler 116 and the transition layer of GFRP 136 may extend beyond the spigot ring 126 of the PCCP 100 to overlie the bell ring 160 at the bell end 152 of the adjacent PCCP 150. The inner surfaces 120 of the filler 116 are preferably also flush with the inner surface 164 of the inner concrete core 162 of the adjacent PCCP 150.

The annular gaps 166 between the PCCP 100 and the adjacent PCCPs 150 are filled with grout or cement 168.

As noted above, each terminus 148 of each layer of the CFRP liner 146 is sealed. Preferably, a double-band seal is used. A double-band seal comprises an elastomeric tube with two spaced-apart expandable metal retaining bands (typically steel) disposed inside the tube. Preferably, annular outwardly-facing lip seals are positioned in registration with the retaining bands. For example, double-band seals offered under the trademark WEKO-SEAL® by Miller Pipeline, LLC having an address at 8850 Crawfordsville Road, P.O. Box 34141, Indianapolis, Indiana 46234 U.S.A., may be used.

As can be seen in FIGS. 1 and 2, double-band seals 170 are disposed inside the PCCP 100 at each end thereof. As noted above, each of the double-band seals 170 comprises a respective elastomeric tube 172 with two spaced-apart expandable retaining bands 174, 176 disposed inside the tube 172 and annular outwardly-facing lip seals 178 positioned in registration with the retaining bands 174, 176. Each double-band seal 170 spans a respective interior joint 180 between the PCCP 100 and a respective adjacent PCCP 150. A first retaining band 174 of each double-band seal 170 is disposed inside the PCCP 100 and a second retaining band 176 of each double-band seal 170 is disposed inside a respective one of the adjacent PCCPs 150. Each terminus 148 of each layer of the CFRP liner 146 is disposed between the first retaining band 174 and the second retaining band 176 of a respective one of the double-band seals 170. The retaining bands 174, 176 are expanded outwardly to apply interface pressure on the CFRP liner 146 and underlying filler 116 and on the inner surface 164 of the inner concrete core 162 of the adjacent PCCP 150, thereby sealing the terminus 148 of each layer of the CFRP liner 146 between retaining bands 174, 176. Preferably, the interface pressure is at least 100 psi (about 0.6895 MPa).

Figure 1A:
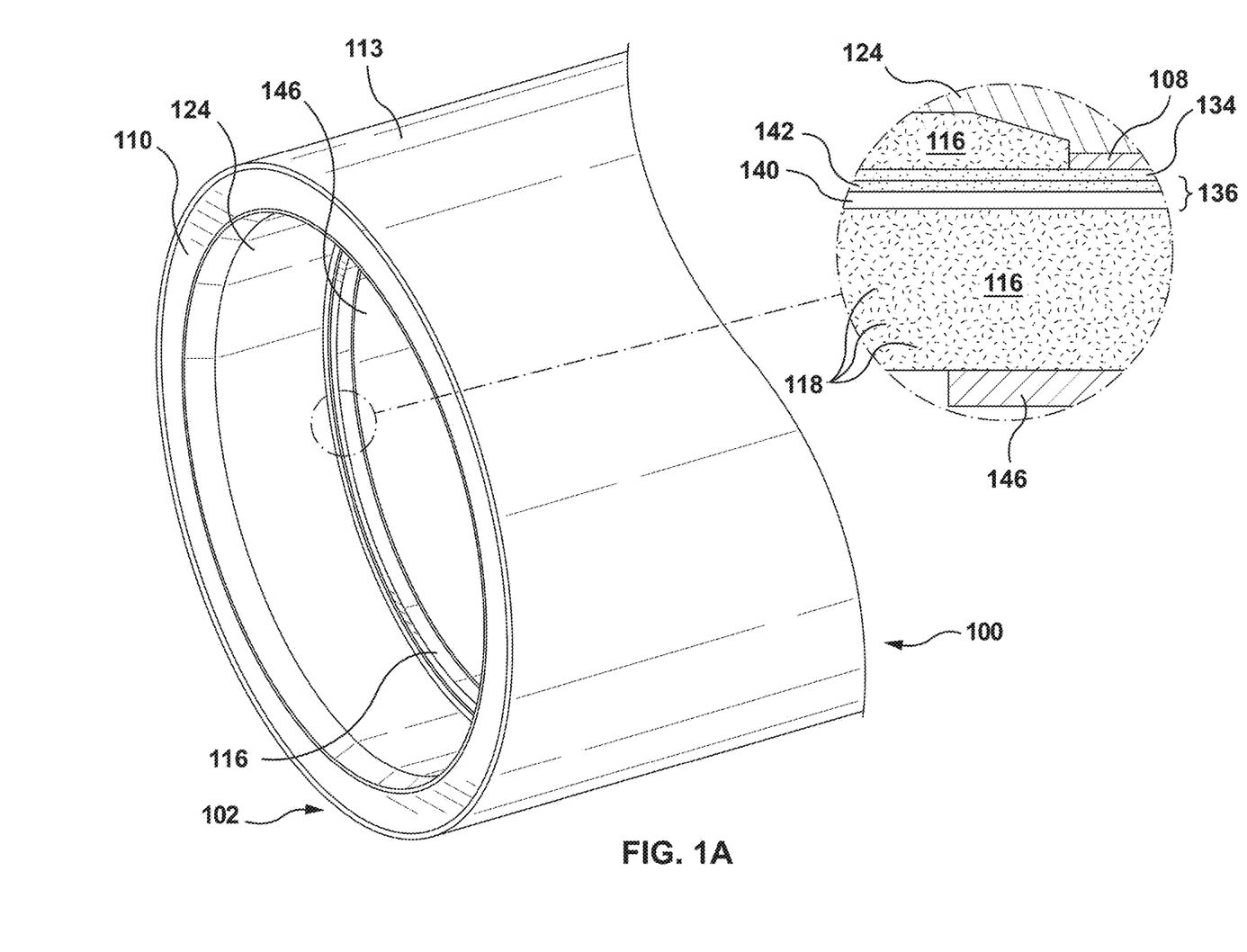
FIG. 1A is a perspective view of the bell end of the refurbished embedded-cylinder pipe of FIG. 1.
Figure 2A:
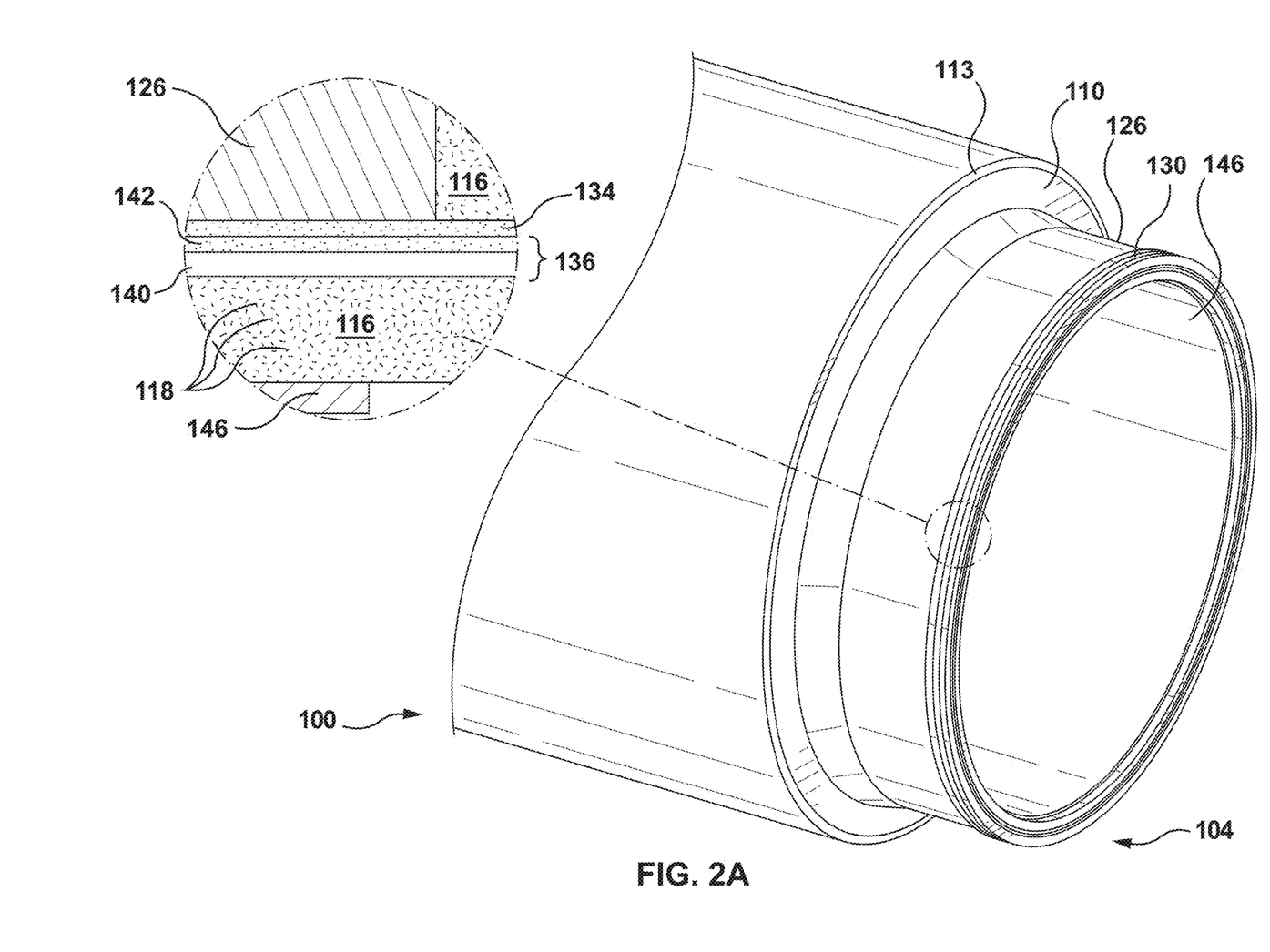
FIG. 2A is a perspective view of the spigot end of the refurbished embedded-cylinder pipe of FIG. 2.

FIGS. 1A and 2A are perspective views of, respectively, the bell end 102 and the spigot end 104 of the first PCCP 100 shown in FIGS. 1 and 2, but without the adjacent PCCPs 150 and without the double-band seals 170. The PCCP 100 would normally not exist in the state shown in FIGS. 1A and 2A since the CFRP liner 146 is normally installed with the PCCP 100 in situ, still connected to the adjacent PCCPs 150, as part of a so-called "no dig" or "trenchless" repair. FIGS. 1A and 2A are provided to show more clearly how the layer(s) of the CFRP liner 146 have substantially unbent cylindrical ends. FIGS. 1, 1A, 2, and 2A together show that the layer(s) of the CFRP liner 146 remain substantially cylindrical with substantially constant diameter along the length of the first PCCP 100.

Figure 3:
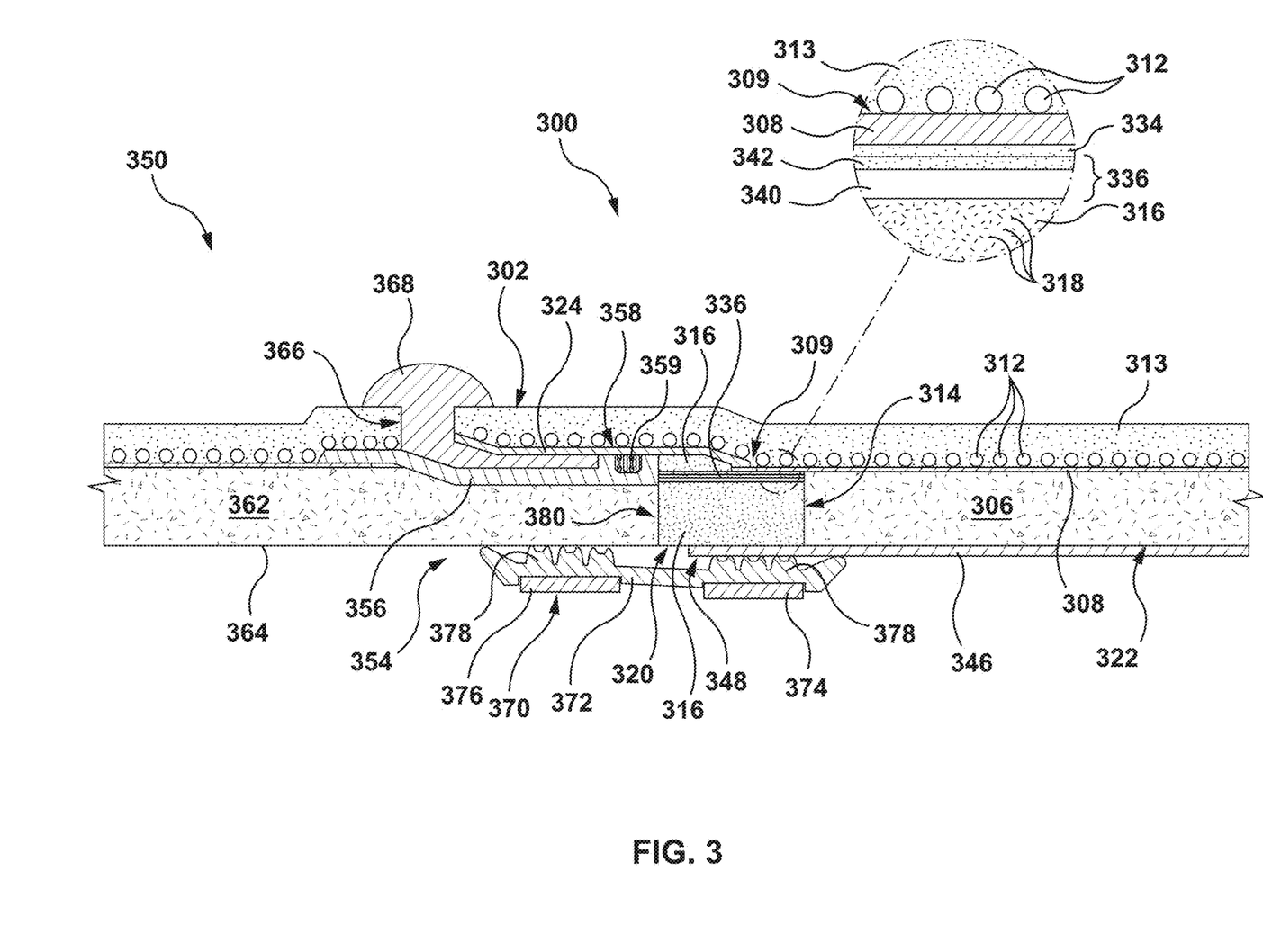
FIG. 3 shows a cross-sectional termination detail of a bell end of a refurbished lined-cylinder pipe according to an aspect of the present disclosure.
Figure 4:
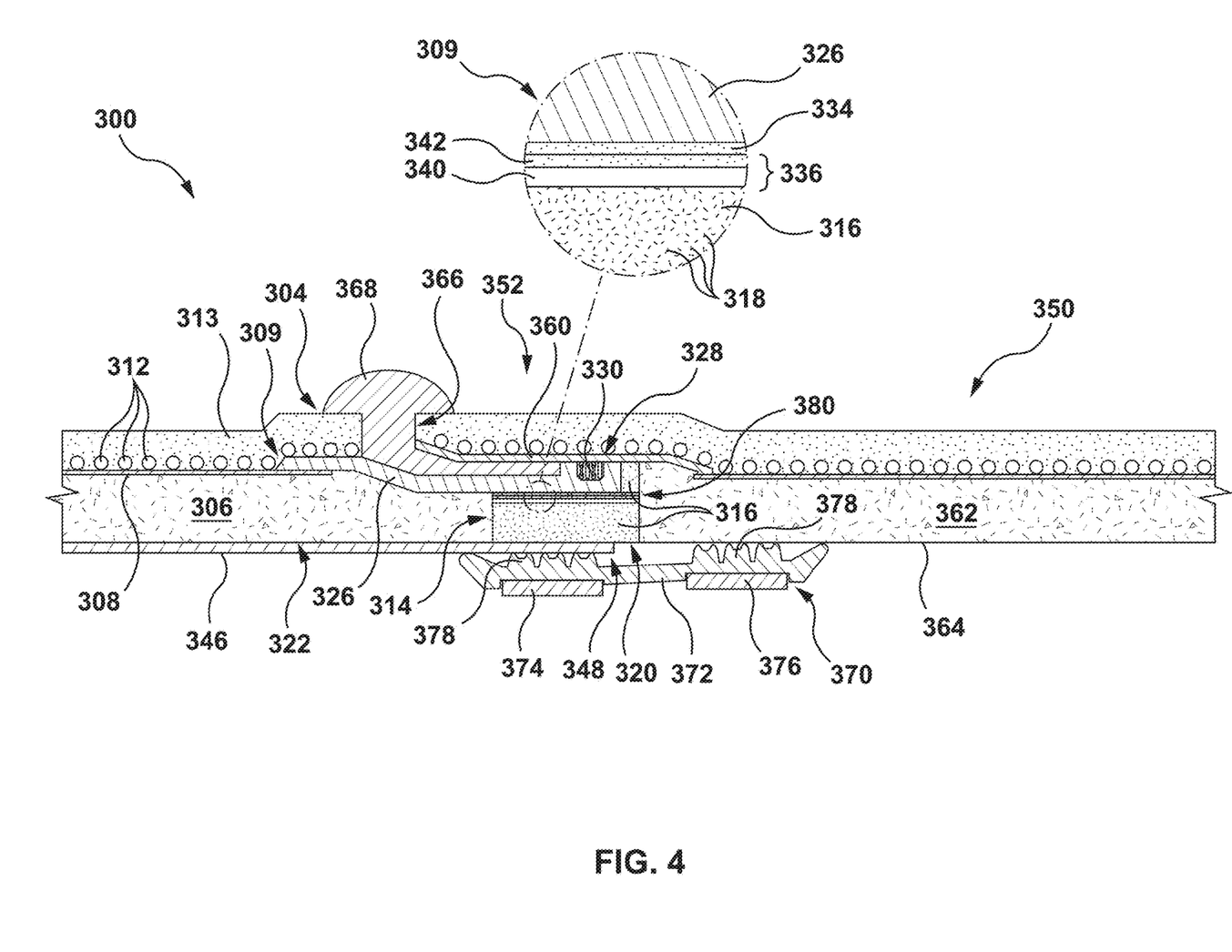
FIG. 4 shows a cross-sectional termination detail of a spigot end of a refurbished lined-cylinder pipe according to an aspect of the present disclosure.

As noted above, FIGS. 1 and 2 show a refurbished PCCP 100 where the PCCP is an embedded-cylinder pipe. FIGS. 3 and 4 show a refurbished PCCP 300, where the PCCP 300 is a lined-cylinder pipe (LCP) comprising an inner concrete core 306, a metal cylinder 308 surrounding the inner concrete core 306, pre-stressing wire 312 wrapped directly on the metal cylinder 308 and a mortar coating 313 surrounding the pre-stressing wire 312 and the metal cylinder 308. The refurbished PCCP 300 shown in FIGS. 3 and 4 is refurbished similarly to the refurbished PCCP 100 shown in FIGS. 1 and 2, with like reference numerals denoting like features but with the prefix "3" instead of "1". The bell end 302 of the PCCP 300 is shown in FIG. 3, and the spigot end 304 of the PCCP 300 is shown in FIG. 4.

The metal cylinder 308 is welded to a bell ring 324 at one end (FIG. 3) and to a spigot ring 326 at the other (FIG. 4) to form a metal core 309 of the PCCP. The spigot ring 326 has an outwardly facing annular recess 328 that accommodates an O-ring seal 330.

An annular recess 314 is formed in the inner concrete core 306 at each end 302, 304 of the PCCP 300. The metal core 309 extends into each annular recess 314 free of the inner concrete core 306. Thus, the inner concrete core 306 terminates at each annular recess 314. The metal cylinder 308 and the bell ring 324 extend into the annular recess 314 at the bell end 302 (FIG. 3), and the spigot ring 326 extends into the annular recess 314 at the spigot end 304 (FIG. 4). The annular recesses 314 may be formed by chipping away the ends of the inner concrete core 306 to expose the metal core 309. Preferably, at least 3 inches (about 7.62 cm) of the inner concrete core 306, measured longitudinally along the PCCP 300, is chipped away.

Filler 316 fills the annular recesses 314 such that the filler 316 is disposed over the metal core 309 in each annular recess 114. The filler 316 preferably comprises thickened thermoset epoxy-based adhesive material and more preferably is reinforced; as shown the filler 316 is an epoxy filler reinforced by chopped glass fibre (CGF) 318. The filler 316 and CGF 318 may be as described above in the context of FIGS. 1 and 2.

One annular recess 314 overlies the bell end of the metal cylinder 308 and the cylinder end of the bell ring 324 (the end welded to the metal cylinder 308). The filler 116 fills the annular recess 314 to cover the bell end of the metal cylinder 308 and the cylinder end of the bell ring 324. The other annular recess 314 overlies the distal end (distal from the metal cylinder 308) of the spigot ring 326. The filler 316 fills the annular recess 314 to cover the distal end of the spigot ring 326. The inner surfaces 320 of the filler 316, including the filler 316 disposed over the bell end of the metal cylinder 308 and the cylinder end of the bell ring 324, and the filler 316 disposed over the cylinder end of the spigot ring 326, is substantially flush with the inner surface 322 of the inner concrete core 306.

Preferably, a primer layer 334 is disposed on the metal core 309 at each end of the PCCP; preferably the primer layer comprises an epoxy primer and more preferably a two-part thermoset epoxy primer, which may be as described above in the context of FIGS. 1 and 2. A transition layer of glass fiber reinforced polymer (GFRP) 336 is preferably disposed over the metal core 309 at each end 302, 304 of the PCCP 300, between the metal core 309 and the filler 316. Each transition layer of GFRP 336 preferably comprises a glass fibre fabric saturated with an epoxy adhesive, preferably a two-part epoxy adhesive. Preferably, a first face 340 of the glass fibre fabric is formed from unidirectional woven fibres and a second face 342 of the glass fibre fabric is formed from chopped glass fibre, and the second face 342 of the glass fibre fabric faces the metal core 309. The transition layer of GFRP 336 may be as described above in the context of FIGS. 1 and 2. As shown, the transition layer of GFRP 336 at the bell end 302 extends past the metal cylinder 308 and overlies the cylinder end of the bell ring 324 and the transition layer of GFRP 336 overlies the distal end of the spigot ring 126. Additional filler 316 is disposed between the respective transition layers of GFRP 336 and the cylinder end of the bell ring 324.

At least one layer of cured carbon fibre reinforced polymer (CFRP) liner 346 is adhered over the inner surface 322 of the inner concrete core 106 and over the inner surfaces 320 of the filler 316 in the annular recesses 314. The number of layers in the CFRP liner 346 depends upon the design specification. The CFRP liner 346 may be as described above in the context of FIGS. 1 and 2.

Each layer of the CFRP liner 346 conforms to the inner surface 322 of the inner concrete core 306 and further conforms to the inner surface 320 of the filler 316. The inner surface 320 of the filler 316 is substantially flush with the inner surface 322 of the inner concrete core 306. Therefore, the combined inner surfaces are substantially cylindrical with substantially constant diameter and accordingly each layer of the CFRP liner 346 is substantially cylindrical with substantially constant diameter along the length of the PCCP 300 and each layer of the CFRP liner 346 has substantially unbent cylindrical ends. Each terminus 348 of each layer of the CFRP liner 346 is sealed.

The PCCP 300 in FIGS. 3 and 4 is part of a pipeline that includes adjacent PCCPs 350 joined to the PCCP 300 at each end 302, 304 thereof. Each of the adjacent PCCPs 350 have a respective bell end 352 (FIG. 4) and spigot end 354 (FIG. 3).

As can be seen in FIG. 3, the bell end 302 of the PCCP 300 receives the spigot end 354 of the adjacent PCCP 350, which includes a spigot ring 356 having an outwardly facing annular channel 358 in which is seated an O-ring gasket 359 that forms a watertight seal with the bell ring 324 of the PCCP 300. The filler 316 extends to and engages the end of the spigot ring 356 of the adjacent PCCP 350.

As shown in FIG. 4, the spigot end 304 of the PCCP 300 is received within the bell end 352 of the adjacent PCCP 350, with the O-ring seal 330 on the spigot ring 326 of the PCCP 300 forming a watertight seal with the bell ring 360 at the bell end 352 of the adjacent PCCP 350. Part of the inner concrete core 362 of the adjacent PCCP 350 may also be removed, with the filler 316 and the transition layer of GFRP 336 extending beyond the spigot ring 326 of the PCCP 300 to overlie the bell ring 360 at the bell end 352 of the adjacent PCCP 350. The inner surfaces 320 of the filler 316 are preferably also flush with the inner surface 364 of the inner concrete core 362 of the adjacent PCCP 350.

Grout or cement 368 is used to fill the annular gaps 366 between the PCCP 300 and the adjacent PCCPs 350.

As shown in FIGS. 3 and 4, double-band seals 370, for example those offered under the trademark WEKO-SEAL® by Miller Pipeline, LLC, are disposed inside the PCCP 300 at each end thereof. Each double-band seal 370 spans a respective interior joint 380 between the PCCP 300 and a respective adjacent PCCP 350, with a first retaining band 374 disposed inside the PCCP 300 and a second retaining band 376 disposed inside a respective one of the adjacent PCCPs 350. Each terminus 348 of each layer of the CFRP liner 346 is disposed between the first retaining band 374 and the second retaining band 376 of a respective one of the double-band seals 370. The retaining bands 374, 376 are expanded outwardly so that the lip seals 378 on the outer surface of the elastomeric tube 172 apply interface pressure on the CFRP liner 346 and underlying filler 316 and on the inner surface 364 of the inner concrete core 362 of the adjacent PCCP 350. This seals the terminus 348 of each layer of the CFRP liner 246 between retaining bands 374, 176. Preferably, the interface pressure is at least 100 psi (about 0.6895 MPa).

Figure 5:
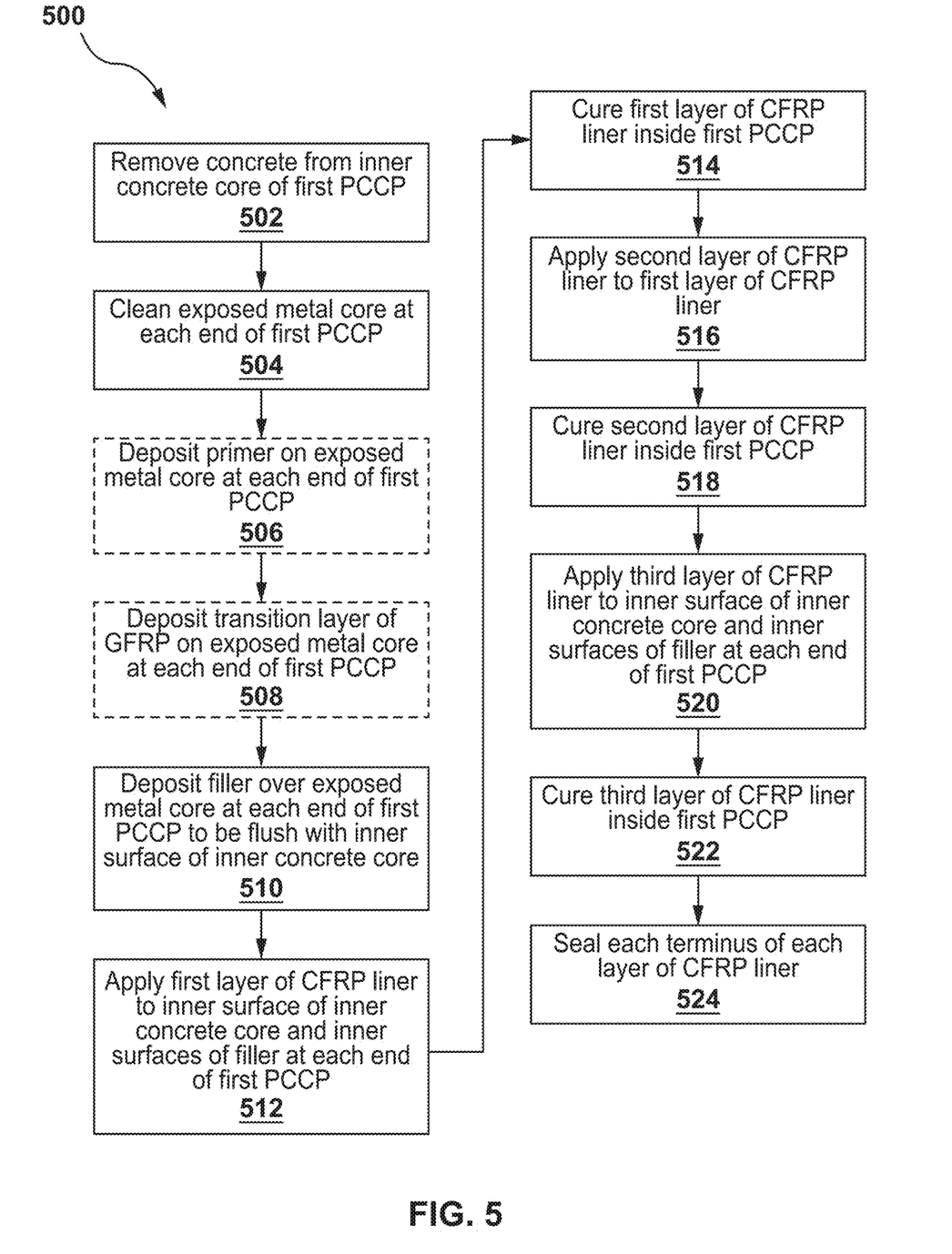
FIG. 5 is a flow chart showing a method for refurbishing a pre-stressed concrete cylinder pipe.

FIG. 5 is a flow chart showing an illustrative method 500 for refurbishing a first pre-stressed concrete cylinder pipe (PCCP). The method 500 shown in FIG. 5 may be applied in respect of an embedded-cylinder pipe to produce a result as shown in FIGS. 1 and 2, and in respect of a lined-cylinder pipe to produce a result as shown in FIGS. 3 and 4. The method 500 is preferably applied as part of a "no dig" or "trenchless" repair, without excavating around the PCCP in respect of which the method 500 is applied.

At step 502, concrete is removed from the inner concrete core of the first PCCP at each end thereof to expose the metal core of the first PCCP at each end of the first PCCP around the entire circumference of the metal core. Preferably at least 3 inches (about 7.62 cm) of the inner concrete core 106 is removed from each end. Removal of the concrete may be accomplished, for example, by chipping away the concrete using suitable tools. Removing the concrete from the inner concrete core may expose metal joint rings (spigot ring and bell ring) of the first PCCP at each end of the first PCCP.

At step 504, after removing the concrete from the inner concrete core at step 502, the exposed metal core at each end of the first PCCP is cleaned, preferably to at least near-white condition. Cleaning may be accomplished, for example, by sandblasting or other suitable methods. Where step 502 also exposes the metal joint rings, step 504 comprises cleaning the exposed metal joint rings.

At optional step 506, after cleaning the exposed metal core, a primer layer may be deposited on the exposed metal core at each end of the first PCCP. Depositing primer at step 506 is preferable, and should be carried out within four hours after cleaning the exposed metal core to avoid flash rust. The primer preferably comprises an epoxy primer and more preferably a two-part epoxy primer. Where step 502 exposes the metal joint rings and the metal joint rings are cleaned at step 504, at step 506 the primer layer may also be deposited on the metal joint rings.

At optional step 508, after cleaning the exposed metal core at step 504 and optionally depositing the primer at step 506, a transition layer of glass fiber reinforced polymer (GFRP) may be deposited over the (optionally primed) exposed metal core at each end of the first PCCP. The transition layer of GFRP may be as described above in the context of FIGS. 1 and 2.

After step 504 and optional steps 506 and 508 if present, at step 510 filler is deposited over the exposed metal core at each end of the first PCCP. The filler is deposited to a thickness such that the inner surfaces of the filler at each end of the first PCCP are substantially flush with the inner surface of the inner concrete core. The filler may be as described above in the context of FIGS. 1 and 2, e.g. a reinforced epoxy filler filled with chopped glass fibre. Where a transition layer of GFRP is deposited at optional step 508, after depositing the filler, the transition layer of GFRP is disposed between the metal core and the inner surface of the filler. Preferably, as part of depositing the filler at step 510, the inner surface of the filler will be roughened and prepared for application of a first layer of a CFRP liner at step 512.

At step 512, after depositing the filler at step 510, a first layer of CFRP liner is applied to the inner surface of the inner concrete core and to the inner surfaces of the filler at each end of the first PCCP. After applying the first layer of CFRP liner at step 512, at step 514 the first layer of CFRP liner is cured inside the first PCCP to secure adhesion of the first layer of CFRP liner to the inner surface of the inner concrete core and the inner surfaces of the filler.

At optional step 516, after curing the first layer of CFRP liner at step 514, a second layer of CFRP liner is applied to the first layer of CFRP liner and then at optional step 518, the second layer of CFRP liner is cured inside the first PCCP to secure adhesion of the second layer of CFRP liner to the first layer of CFRP liner.

After curing the second layer of CFRP liner at optional step 518, at optional step 520, a third layer of CFRP liner is applied to the second layer of CFRP liner. After application of the third layer of CFRP liner at optional step 520, at optional step 522 the third layer of CFRP liner is cured inside the first PCCP to secure adhesion of the third layer of CFRP liner to the second layer of CFRP liner.

The layers of CFRP liner may be applied at steps 512, 516 and 520 in wet layup. After each layer of CFRP liner is applied, each layer of CFRP liner conforms to the inner surface of the first PCCP and the inner surfaces of the filler. Moreover, each layer of CFRP liner remains substantially cylindrical with substantially constant diameter along a length of the first PCCP and with substantially unbent cylindrical ends.

At step 524, after curing the third layer of CFRP liner at step 522, each terminus of the first layer of CFRP liner, the second layer of CFRP liner and the third layer of CFRP liner is sealed. Sealing each terminus of the layers of CFRP liner may be carried out by placing double-band seals inside the first PCCP at each end thereof. In this arrangement, each double-band seal spans an interior joint between the first PCCP and an adjacent PCCP, with a first retaining band of each double-band seal disposed inside the first PCCP and a second retaining band of each double-band seal disposed inside a respective one of the adjacent PCCPs. At each end of the first PCCP, the terminus of each layer of CFRP liner is disposed between the first retaining band and the second retaining band of a respective one of the double-band seals. The bands are expanded outwardly to exert the appropriate pressure, preferably at least 100 psi (about 0.6895 MPa).

The illustrated method in FIG. 5 relates to an embodiment for a three-layer CFRP liner, simply for purposes of illustration. The method 500 can be adapted for a single layer CFRP liner by omitting steps 516 to 522, or for a two-layer CFRP liner by omitting steps 520 and 522, or for a CFRP liner of more than three layers by adding additional application and curing steps for additional layers prior to sealing at step 524.

Certain preferred embodiments have been described by way of example. It will be apparent to persons skilled in the art that a number of variations and modifications can be made without departing from the scope of the claims.

What is claimed is:

1. A method for refurbishing a first pre-stressed concrete cylinder pipe (PCCP), the method comprising:
    removing concrete from an inner concrete core of the first PCCP at each end thereof to expose a metal core of the first PCCP at each end of the first PCCP;
    after removing the concrete, cleaning the exposed metal core at each end of the first PCCP;
    after cleaning the exposed metal core, depositing filler over the exposed metal core at each end of the first PCCP, wherein the filler is deposited to a thickness wherein the filler at each end of the first PCCP is substantially flush with an inner surface of the inner concrete core;
    after depositing the filler, applying a first layer of carbon fibre reinforced polymer (CFRP) liner to the inner surface of the inner concrete core and to inner surfaces of the filler at each end of the first PCCP, wherein:
        the first layer of CFRP liner conforms to the inner surface of the inner concrete core and to the inner surfaces of the filler;
        the first layer of CFRP liner remains substantially cylindrical with substantially constant diameter along a length of the first PCCP;
        the first layer of CFRP liner has substantially unbent cylindrical ends;
    after applying the first layer of CFRP liner, curing the first layer of CFRP liner inside the first PCCP to secure adhesion of the first layer of CFRP liner to the inner surface of the inner concrete core and the inner surfaces of the filler; and
    after curing the first layer of CFRP liner, sealing each terminus of the first layer of CFRP liner.

2. The method of claim 1, wherein sealing each terminus of the first layer of CFRP liner comprises placing double-band seals inside the first PCCP at each end thereof, wherein:
    each double-band seal spans an interior joint between the first PCCP and an adjacent PCCP;
    a first retaining band of each double-band seal is disposed inside the first PCCP and a second retaining band of each double-band seal is disposed inside a respective one of the adjacent PCCPs; and
    each terminus of the first layer of CFRP liner is disposed between the first retaining band and the second retaining band of a respective one of the double-band seals.

3. The method of claim 1, further comprising:
    after curing the first layer of CFRP liner, and before sealing each terminus of the first layer of CFRP liner, applying a second layer of CFRP liner to the first layer of CFRP liner and curing the second layer of CFRP liner inside the first PCCP to secure adhesion of the second layer of CFRP liner to the first layer of CFRP liner; and
    after curing the second layer of CFRP liner, sealing each terminus of the second layer of CFRP liner.

4. The method of claim 3, further comprising:
    after curing the second layer of CFRP liner, and before sealing each terminus of the first layer of CFRP liner and each terminus of the second layer of CFRP liner, applying a third layer of CFRP liner to the second layer of CFRP liner and curing the third layer of CFRP liner inside the first PCCP to secure adhesion of the third layer of CFRP liner to the second layer of CFRP liner; and
    after curing the third layer of CFRP liner, sealing each terminus of the first layer of the CFRP liner, the second layer of CFRP liner and the third layer of CFRP liner.

5. The method of claim 1, further comprising:
    after cleaning the exposed metal core and before depositing the filler, depositing a primer layer on the exposed metal core at each end of the first PCCP.

6. The method of claim 1, further comprising:
    after cleaning the exposed metal core and before depositing the filler, depositing a transition layer of glass fiber reinforced polymer (GFRP) over the exposed metal core at each end of the first PCCP;

wherein, after depositing the filler, the transition layer of GFRP is disposed between the metal core and the inner surfaces of the filler.

7. The method of claim 6, wherein:
the transition layer of GFRP comprises a glass fibre fabric saturated with an epoxy adhesive;
a first face of the glass fibre fabric is formed from unidirectional woven fibres;
a second face of the glass fibre fabric is formed from chopped glass fibres; and
the second face of the glass fibre fabric faces the metal core.

8. The method of claim 1, wherein the filler is an epoxy filler reinforced with chopped glass fibre.

9. The method of claim 1, wherein:
removing the concrete from the inner concrete core at each end thereof exposes portions of metal joint rings of the metal core;
cleaning the exposed metal core at each end of the first PCCP comprises cleaning the exposed portions of the metal joint rings at each end of the first PCCP; and
depositing the filler over the exposed metal core at each end of the first PCCP comprises depositing the filler over the cleaned exposed portions of the metal joint rings at each end of the first PCCP to be substantially flush with the inner surface of the inner concrete core.

10. The method of claim 1, wherein the PCCP is a lined-cylinder pipe (LCP).

11. The method of claim 1, wherein the PCCP is an embedded-cylinder pipe (ECP).

12. A refurbished first pre-stressed concrete cylinder pipe (PCCP), comprising:
an inner concrete core;
a metal core comprising a metal cylinder surrounding the inner concrete core and a respective metal joint ring at each end of the metal cylinder;
pre-stressing wire surrounding the metal cylinder; and
a mortar coating surrounding the pre-stressing wire;
wherein:
an annular recess is formed in the inner concrete core at each end of the PCCP with the metal cylinder extending into each annular recess free of the inner concrete core;
filler is disposed over the metal core in each annular recess, wherein the filler is substantially flush with an inner surface of the inner concrete core;
at least one layer of cured carbon fibre reinforced polymer (CFRP) liner is adhered over the inner surface of the inner concrete core and over inner surfaces of the filler in the annular recesses, wherein:
each layer of CFRP liner conforms to the inner surface of the inner concrete core and the inner surfaces of the filler;
each layer of CFRP liner is substantially cylindrical with substantially constant diameter along a length of the first PCCP;
each layer of CFRP liner has substantially unbent cylindrical ends;
wherein each terminus of each layer of CFRP liner is sealed.

13. The first PCCP according to claim 12, further comprising a primer layer on the metal core at each end of the first PCCP.

14. The first PCCP according to claim 12, further comprising:
a transition layer of glass fiber reinforced polymer (GFRP) over the metal core at each end of the first PCCP;
wherein the transition layer of GFRP is disposed between the metal core and the filler.

15. The first PCCP according to claim 14, wherein:
the transition layer of GFRP comprises a glass fibre fabric saturated with an epoxy adhesive;
a first face of the glass fibre fabric is formed from unidirectional woven fibres;
a second face of the glass fibre fabric is formed from chopped glass fibres; and
the second face of the glass fibre fabric faces the metal core.

16. The first PCCP of claim 12, wherein the filler is an epoxy filler reinforced with chopped glass fibre.

17. The first PCCP of claim 12, wherein:
each annular recess overlies a portion of the respective one of the metal joint rings of the metal core; and
the filler is disposed over the portions of the metal joint rings within the annular recesses.

18. The first PCCP of claim 12, wherein the first PCCP is a lined-cylinder pipe (LCP) wherein the pre-stressing wire is wrapped directly on the metal core and the mortar coating surrounds the pre-stressing wire and the metal core.

19. The first PCCP of claim 12, wherein the PCCP is an embedded-cylinder pipe (ECP) wherein an outer concrete core surrounds the metal core and the pre-stressing wire is wrapped on the outer concrete core, with the mortar coating surrounding the pre-stressing wire and the outer concrete core.

20. A pipeline, comprising:
the first PCCP according to claim 12; and second PCCPs joined to the first PCCP at each end thereof;
wherein double-band seals are disposed inside the first PCCP at each end thereof, wherein:
each double-band seal spans an interior joint between the first PCCP and an adjacent one of the second PCCPs;
a first retaining band of each double-band seal is disposed inside the first PCCP and a second retaining band of each double-band seal is disposed inside a respective one of the second PCCPs; and
each terminus of each layer of CFRP liner is disposed between the first retaining band and the second retaining band of a respective one of the double-band seals.

* * * * *